No. 784,407. PATENTED MAR. 7, 1905.
J. C. H. KRAMERS & J. G. AARTS.
PROCESS OF MAKING GAS.
APPLICATION FILED MAR. 15, 1901.

3 SHEETS—SHEET 1.

Witnesses:
Inventors:
Joannes Coenradus Hubertus Kramers
Jacobus Gerardus Aarts
By Richards & Co
their Attorneys.

No. 784,407. PATENTED MAR. 7, 1905.
J. C. H. KRAMERS & J. G. AARTS.
PROCESS OF MAKING GAS.
APPLICATION FILED MAR. 15, 1901.
3 SHEETS—SHEET 3.
Fig. 4.
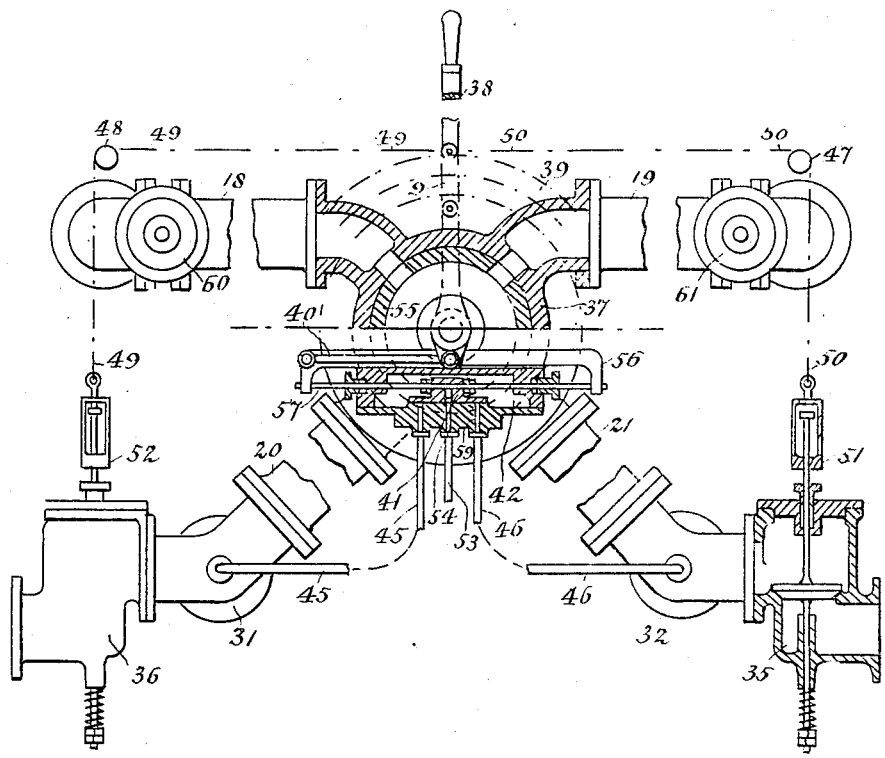
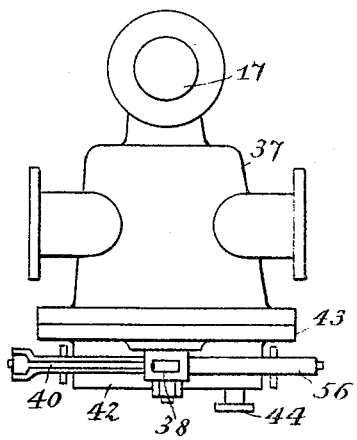
Fig. 5.
Witnesses:
E. B. Bolton
Inventors:
Joannes Coenradus Hubertus Kramers
Jacobus Gerardus Aarts
By Richards & Co
their Attorneys No. 784,407. Patented March 7, 1905.

UNITED STATES PATENT OFFICE.

JOANNES COENRADUS HUBERTUS KRAMERS, OF MASTRICHT, AND JACOBUS GERARDUS AARTS, OF DONGEN, NETHERLANDS, ASSIGNORS TO WATER-GAS-MAATSCHAPPŸ SYSTEEM DR. KRAMERS & AARTS, OF AMSTERDAM, NETHERLANDS, A COMPANY INCORPORATED ACCORDING TO DUTCH LAW.

PROCESS OF MAKING GAS.

SPECIFICATION forming part of Letters Patent No. 784,407, dated March 7, 1905.

Application filed March 15, 1901. Serial No. 51,303.

*To all whom it may concern:*

Be it known that we, JOANNES COENRADUS HUBERTUS KRAMERS, residing at 53 Fongerschestraat, Mastricht, and JACOBUS GERARDUS AARTS, residing at Lagenham B. No. 10, Dongen, near Breda, Netherlands, citizens of the Netherlands, have invented certain new and useful Improvements in Processes of Making Gas, of which the following is a specification.

As is well known, water-gas is made by passing steam over red-hot carbon, hydrogen and carbon monoxid being produced. The heat necessary for the production of the water-gas is obtained by the combustion of carbon.

Our invention relates to a process by which pure water-gas of uniform composition may be obtained from any kind of carbon with the smallest possible consumption of carbon, such gas being fitted in uncarbureted condition for heating purposes and for incandescence lighting and when carbureted as an illuminant.

The apparatus consists of two generators, two regenerators, and a recuperator, as illustrated in the accompanying drawings.

Figures 1, 3:
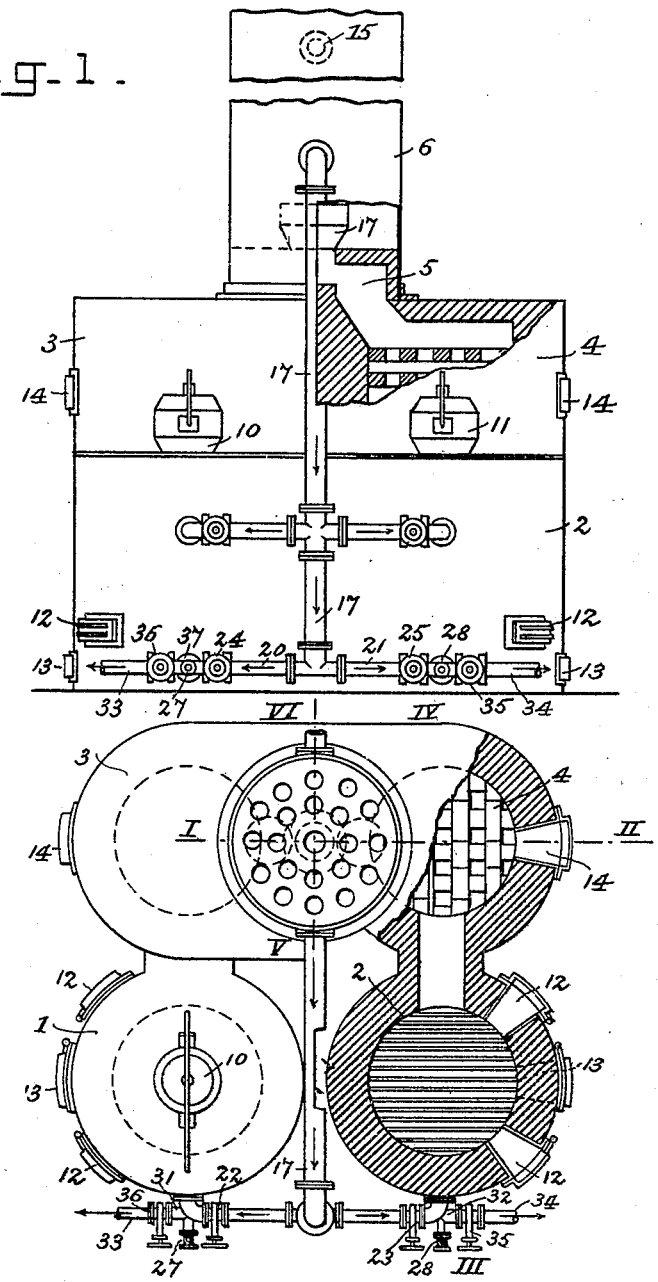
Figure 2:
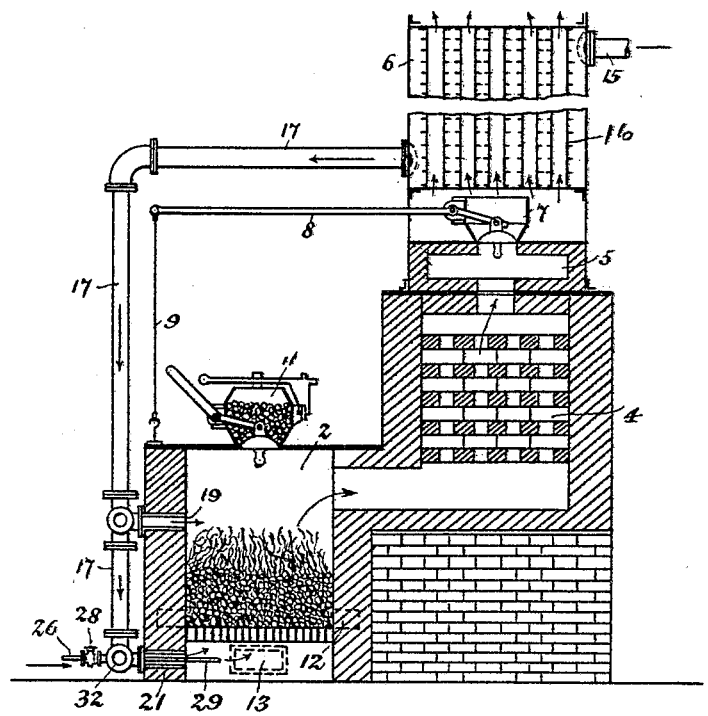

In Sheet 1, of which Figure 1 is a front elevation, partly in section, on line I II of Fig. 3, Fig. 2 is a cross-section through one generator and regenerator on line III IV of Fig. 3 and through the economizer on line V VI of Fig. 3; and Fig. 3 is a plan, partly in section, while in Sheet 2 Fig. 4 is a sectional elevation, on an enlarged scale, of a distributing device specially applicable to the apparatus; and Fig. 5 is a plan of the central casing thereof.

The generators 1 2 are side by side, and behind each, on a somewhat higher level, is the corresponding regenerator 3 4, with which the generator is in communication. Both regenerators open into the chamber 5, Figs. 1 and 2, between which and the air-heater 6 above it is a valve 7, closed or opened by lever 8 and chain 9, Fig. 2. Each generator has a charging-hopper 10 11, kindling-openings 12, and an ash-pit door 13. At suitable positions in the regenerators are provided windows 14.

The air-blast enters the air-heater by pipe 15, travels round the heating-pipes 16, and issues through the main 17 to feed the generator. This main 17 has two branches 18 19, which enter the generators, respectively, above the fuel therein, and other two branches 20 21, which enter the generators, respectively, below the fire-bars. Valves 22 23 24 25 control these branch pipes, respectively. Steam is supplied through pipes 26, Fig. 2, and is controlled by cocks 27 28. It enters the generator below the fire-bars through pipe 29.

The union pieces 31 32 carry, besides the air and steam pipes, gas-pipes 33 34, Fig. 3, which are controlled by valves 35 36 and conduct the water-gas to the purifiers.

The apparatus works as follows: After the hot blow, both generators being in use with valve 7 and all the air-valves open, the surface of the fuel in one generator—say 1—is covered with coal from the hopper 10. The valve 7 and the air-valves 22 23 24 25 are now closed and the steam-cock 27 is opened, steam being admitted under the fire-bars in generator 1. The steam is thus decomposed and water-gas is produced, which when it arrives at the freshly-added layer of coal has a temperature high enough to gasify the coal partly, so that a mixture of water-gas with heavy and light hydrocarbons is the result. This mixture passes through the regenerators 3 4 and downward through the red-hot fuel in generator 2. Here the hydrocarbons are converted into hydrogen and carbon monoxid, and a part of the ammonia is decomposed into nitrogen and hydrogen. While the gases are passing through the regenerators, undecomposed steam and carbon monoxid may react to form hydrogen and carbon dioxid. Such carbon dioxid, however, is reduced to carbon monoxid in the second generator. The regenerators also serve, first, to fix the hydrocarbons—that is, to convert them into hydrogen and, by action of undecomposed steam, carbon monoxid—and, second, to withdraw water-vapor from the mixture, so that when it arrives at the second generator it may be as free as possible from water and no carbon dioxid may be formed in the second generator. The very pure water-gas leaves the generator 2 through the open valve 35 and pipe 34 and passes to the purifiers. When the temperature in the generators and regenerators has fallen too low, the steam-cock 27 and the valve 35 are closed, while the valves 7, 22, 23, 24, and 25 are opened, and a hot blow follows. The carbon monoxid formed during this blow is burned at the surface of the fuel by the secondary air admitted through pipes 18 19, the heat thus developed being imparted to the regenerators. The gases, chiefly carbon dioxid and nitrogen, which escape from the regenerators pass into the air through the heating-tubes 16, imparting to these most of their sensible heat. The air blown through pipe 15 travels round the hot tubes 16 and is thus heated before it is delivered to the generators. When it is seen through the windows 14 that the regenerators 3 4 are hot enough, the fuel in generator 2 is covered with fresh coal, and the valves 7 22 23 24 25 having been closed steam is admitted beneath the firebars of generator 2. The water-gas produced then passes through the regenerators, down through the fuel in generator 1, and away through the opened valve 36 and pipe 33 to the purifiers.

The distributing-valve shown in Figs. 4 and 5 is arranged so that the four valves 22, 23, 24, and 25 are combined in a single four-way cock 37, in the casing of which the main 17 and the branches 18, 19, 20, and 21 terminate. The cock 55 is turned by the lever 38, which moves along the sector 39. When this lever is in its middle position, as shown in Fig. 4, all the air-pipes are in communication with the main 17, but are all cut off therefrom when the lever is turned through an angle of forty-five degrees to the right or to the left. The lever 38 is extended beyond its point of attachment to the axis of the cock, and this end of it is linked by rod 40 to a sliding bar 56, which carries a rod 57, actuating a slide-valve 41 in the valve-chest 42, attached to the cover 43 of the casing of the four-way cock, Fig. 5. To a suitable point of the lever 38 are attached chains 49 50, which pass over pulleys 48 47 and are weighted by weights 51 52. The other ends of these chains are attached to the spring-valves 36 35, respectively, the arrangement being such that the valves do not open until the chain has been pulled up through a certain distance. In the air-supply pipes 18 19 are further valves 60 61, graduated to indicate the extent to which they are open, for the purpose of accurately adjusting the air-supply above the fuel. The chain 9 by which the valve 7, Fig. 2, between the regenerators and the economizer is actuated is also attached to a suitable point of lever 38, Fig. 4. The operation of this distributing device is as follows: During the hot blow the lever 38 is in its middle position, the air-supply pipes are open, the steam-supply pipes are closed, the gas-valves 35 36 are closed, and the valve 7 is open. For gas-making in the direction from generator 1 to generator 2 the lever is moved to the left, whereupon first the air-supply pipes and the valve 7 are closed, then the gas-valve 35 is opened and by the movement of the steam slide-valve to the right the port 58 is uncovered. Steam is thus admitted through pipe 45 and union 32 to generator 1. To change from gas-making to hot blow, the lever 38 is moved back into its middle position, whereby the steam-supply is first cut off by slide-valve 41, the gas-valve is next closed, and finally the air-supply pipes and valve 7 are opened. For gas-making in the direction opposite to that first described the lever is moved to the right. The air-supply pipes and valve 7 are first closed, then the gas-valve 36 is opened, and finally the steam is admitted through port 59, pipe 46, and union 32 into generator 2. The valve-chest 42 is provided with a third steam-pipe 53. When the lever 38 is in its middle position—that is, during the hot blow—the steam escapes through port 54 and this pipe 53 to the injector of the boiler. During the gas-making period the blast remains in action, so that a certain pressure is maintained in the air-supply pipes which is about equal to that in the gas-mains and is observed by means of a manometer. The object of this is that water-gas shall not leak through the valves and form an explosive mixture with the air.

In the valve arrangement shown in Figs. 4 and 5 a chain may be attached to the lever 38 and may be connected with the governor of the motor driving the blower, so that the latter may be run at the speed necessary for producing the pressure referred to above during the gas-making.

It is advantageous to fill the hoppers 10 and 11 as soon as they have been emptied, so that the coal may become heated during two periods of hot blow and two periods of gas-making and may enter the generator in a hot condition. In this manner sudden cooling of the red-hot fuel by the admission of the coal is avoided.

The height of the column of fuel in this apparatus is not great, so that any kind of fuel may be used—such as coke, hard coal, brown coal, or refuse containing carbon—and combustion to carbon dioxid is possible without great speed of air-blast.

The dimensions of the generators may be small, so that the quantity of nitrogen and carbon dioxid left in the apparatus when the change is made from hot blow to gas-making is proportionally small and the water-gas is only little contaminated by these gases.

The chief advantages of the apparatus are as follows:

First. The combination of two generators which are used in such manner that they are traversed alternately by steam from below upward and by water-gas from above downward. At every gas-making, therefore, the condition of the fuel remains nearly the same, so that a water-gas of uniform composition is produced.

Second. The introduction of a layer of coal onto the surface of the fuel in the generator at the moment when this is to be used, whereby the heavy and light hydrocarbons distilled from this coal during the gas-making instead of condensing as tar in the pipes or later in the condenser are passed through the two regenerators and the column of red-hot fuel in the second generator, so that they are converted into the permanent gases, carbon monoxid and hydrogen.

Third. The fact that the steam and water-gas pass through four hot chambers—namely, the first generator, the two regenerators, and the second generator—whereby, on the one hand, the hydrocarbons are fixed in the regenerators and decomposed into hydrogen and carbon monoxid by the steam not decomposed in the first generator and, on the other hand, the carbon monoxid reacts with the steam to form hydrogen and carbon dioxid, which latter is reduced to carbon monoxid in the second generator.

Fourth. The preliminary heating of the coal in the charging-hoppers, where it remains during two hot blasts and two gas-makings.

Fifth. The preliminary heating of the air in the economizer by heating-tubes.

Sixth. The presence of a counter-pressure in the air-supply pipes during the gas-making, whereby explosions are prevented.

Seventh. The control of all the valves and cocks by a single lever, as shown in Figs. 4 and 5, whereby the opening and closing always occurs at the correct moment, which is important for the quality and uniformity of the gas and mistakes in setting the valves cannot occur.

The process is also applicable for the manufacture of semiwater-gas, a mixture of nitrogen, hydrogen, and carbon monoxid, specially applicable for heating purposes and for power. The hot blow and the regenerators 3 4 are in this case omitted, and during the gas-making a mixture of steam and air instead of steam alone is blown into the generator in use.

The gas produced passes downward through the column of red-hot fuel in the second generator and is then passed successively through an economizer and a preliminary air-heater, finally arriving at the purifiers in a properly-cooled condition. In the economizer the mixture of steam and air is heated before it is admitted to the generator, while the air drawn in by the steam-injector is heated in the preliminary heater before it comes in contact with the steam, the heating being on the counter-current principle. A central four-way cock is also applicable to this modified apparatus.

Having thus described the nature of this invention and the best means we know of carrying the same into practical effect, we claim—

The herein-described process of making gas which consists in simultaneously firing up a pair of generators to a state of incandescence, supplying fresh coal to the top of the incandescent fuel in one generator, passing steam from beneath the fuel-bed up through said incandescent bed and the freshly-supplied fuel, passing the products in the condition in which they arrive from the fuel-bed through a plurality of regenerators capable of fixing and oxidizing the gaseous products and causing a part of the carbon monoxid to react with the excess of steam to form carbon dioxid, and then passing said products downward through the incandescent material in the other generator to reduce the carbon dioxid, substantially as described.

In testimony whereof we have hereunto set our hands in presence of two subscribing witnesses.

JOANNES COENRADUS HUBERTUS KRAMERS.
JACOBUS GERARDUS AARTS.

Witnesses:
    THOMAS HERMANUS VERHAVE,
    AUGUST SIEGFRIED DOCEN.